(12) United States Patent
Aldraihem

(10) Patent No.: US 8,371,129 B2
(45) Date of Patent: Feb. 12, 2013

(54) STANDING WAVE THERMOACOUSTIC PIEZOELECTRIC SYSTEM AND APPARATUS FOR GENERATING ELECTRICAL ENERGY FROM HEAT ENERGY

(75) Inventor: Osama J Aldraihem, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 387 days.

(21) Appl. No.: 12/763,705

(22) Filed: Apr. 20, 2010

(65) Prior Publication Data

US 2011/0252809 A1    Oct. 20, 2011

(51) Int. Cl.
  *F25B 9/00*    (2006.01)
(52) U.S. Cl. ............................................. 62/6; 62/235.1
(58) Field of Classification Search .................. 62/6, 3.1, 62/235.1, 335; 126/569, 684; 310/322, 334; 60/517, 641.8
  See application file for complete search history.

(56) References Cited

U.S. PATENT DOCUMENTS

| 6,574,968 | B1 * | 6/2003 | Symko et al. ........................ 62/6 |
| 6,804,967 | B2 * | 10/2004 | Symko et al. ........................ 62/6 |
| 7,143,586 | B2 * | 12/2006 | Smith et al. ......................... 62/6 |
| 7,404,296 | B2 * | 7/2008 | Watanabe et al. .................... 62/6 |
| 2003/0192324 | A1 * | 10/2003 | Smith et al. ......................... 62/6 |
| 2004/0000150 | A1 * | 1/2004 | Symko et al. ........................ 62/6 |
| 2005/0274123 | A1 * | 12/2005 | Smith et al. ......................... 62/6 |
| 2006/0185370 | A1 * | 8/2006 | Watanabe et al. .................... 62/6 |
| 2007/0090723 | A1 * | 4/2007 | Keolian et al. .................. 310/311 |
| 2009/0134748 | A1 * | 5/2009 | Penciu .......................... 310/339 |
| 2009/0184604 | A1 * | 7/2009 | Symko et al. .................. 310/334 |
| 2009/0260360 | A1 * | 10/2009 | Penciu ....................... 60/641.15 |

* cited by examiner

*Primary Examiner* — Mohammad Ali
(74) *Attorney, Agent, or Firm* — Timberline Patent Law Group PLLC; Mark Farrell

(57) ABSTRACT

A standing wave thermoacoustic piezoelectric apparatus capable of generating electrical energy from heat energy is provided. The standing wave thermoacoustic piezoelectric apparatus includes a housing, a porous stack and a piezoelectric bimorph. The housing comprises a compressible fluid and has a first portion and a second portion. The second portion receives the heat energy from a heat source for creating a temperature gradient between the first portion and the second portion. A cold heat exchanger within the first portion is positioned at one end of the porous stack. The compressible fluid traverses between the first portion and the second portion through the porous stack to generate standing acoustic waves for generating acoustic energy. The piezoelectric bimorph positioned at an end of the first portion opposite to an end of the first portion having the cold heat exchanger, oscillates based on the acoustic energy for generating the electrical energy.

24 Claims, 8 Drawing Sheets

STANDING WAVE THERMOACOUSTIC PIEZOELECTRIC SYSTEM AND APPARATUS FOR GENERATING ELECTRICAL ENERGY FROM HEAT ENERGY

FIELD OF THE INVENTION

The present invention generally relates to generating electrical energy from heat energy, and more specifically, to a standing wave thermoacoustic piezoelectric apparatus and a standing wave thermoacoustic piezoelectric system for generating electrical energy from heat energy using standing thermoacoustic waves.

BACKGROUND OF THE INVENTION

Thermoacoustic engines are commonly used as heat pumps or refrigerators, they utilize energy associated with thermoacoustic waves to generate electrical energy.

In existing technologies, usually thermoacoustic engines receive heat from a heat source and use a large part of the heat to generate thermoacoustic waves. Further, energy associated with the thermoacoustic waves may be used to perform various types of works. In order to use the energy associated with the thermoacoustic waves, the thermoacoustic engines use a hot heat exchanger and a cold heat exchanger. A porous structure may be configured between the hot heat exchanger and the cold heat exchanger. The porous structure is made up of one or more of metal foils, a metal mesh, a sheet of a foamed metal, and sheets of filter paper. Additionally, the thermoacoustic engines may include one or more moving parts and moving masses to generate the thermoacoustic waves. Further, the one or more moving parts and moving masses require sliding seal mechanisms for their operation. The thermoacoustic waves are generated based on pressure and volume oscillations of a fluid within the thermoacoustic engines. The pressure and volume oscillations of the fluid are generated using the heat received from the heat source and movements of the one or more moving parts and moving masses. During operation, high pressure is created within the thermoacoustic waves for generating thermoacoustic waves.

Further, a free piston mechanism may be used to reduce complexities in using the one or more moving parts and moving masses in the thermoacoustic engines. The free piston mechanism in the thermoacoustic engines utilizes gas springs to generate thermoacoustic waves. The gas springs in the thermoacoustic engines work similar to mechanical pistons, thereby, partially eliminating the need of sliding seal mechanisms. However, the use of moving masses in the thermoacoustic engines is still required in such thermoacoustic engines.

Therefore, there is a need for efficient way of generating electrical energy from heat energy using thermoacoustic waves.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
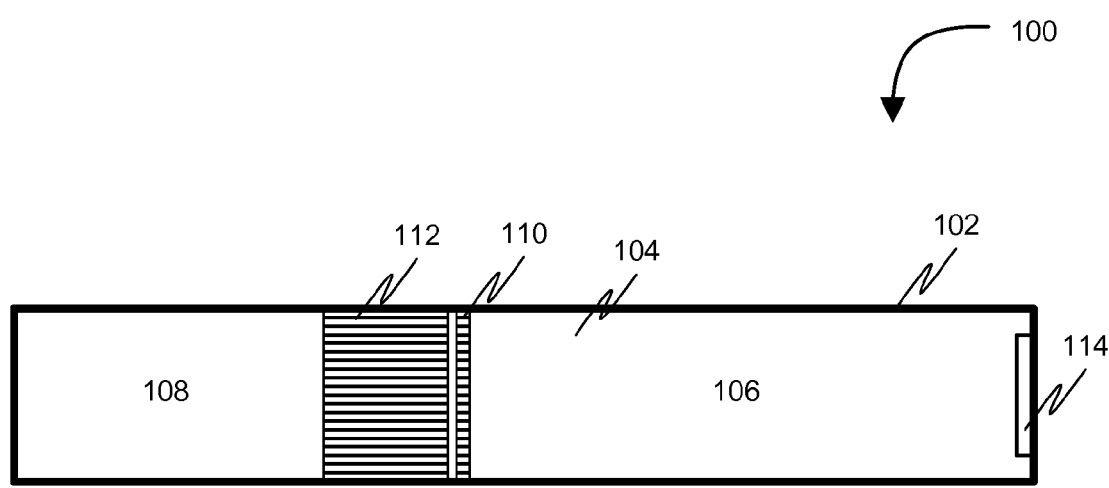
FIG. 1 illustrates a standing wave thermoacoustic piezoelectric apparatus in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a standing wave thermoacoustic piezoelectric apparatus and system components related to a standing wave thermoacoustic piezoelectric system. Accordingly, the apparatus components, method steps and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides a standing wave thermoacoustic piezoelectric apparatus. The standing wave thermoacoustic piezoelectric apparatus generates electrical energy from heat energy. The standing wave thermoacoustic piezoelectric apparatus includes a housing. The housing includes a compressible fluid. Additionally, the housing has a first portion and a second portion. The second portion receives the heat energy from a heat source. The heat energy received by the second portion creates a temperature gradient between the second portion and the first portion of the housing. The first portion includes a cold heat exchanger that facilitates in creating the temperature gradient within the housing. Further, the standing wave thermoacoustic piezoelectric apparatus includes a porous stack. The porous stack has the cold heat exchanger positioned at one end. The compressible fluid within the housing traverses between the first portion and the second portion through the porous stack in response to creation of the temperature gradient. Due to traversal of the compressible fluid, standing acoustic waves are generated thereby generating acoustic energy in the first portion. Further, the standing wave thermoacoustic piezoelectric apparatus includes a piezoelectric bimorph at an end of the first portion opposite to an end of the first portion having the cold heat exchanger. The piezoelectric bimorph oscillates based on the acoustic energy generated by the standing acoustic waves. The energy generated due to oscillation of the piezoelectric bimorph is utilized for generating the electrical energy.

Referring to figures and in particular to FIG. 1, a standing wave thermoacoustic piezoelectric apparatus 100 is illustrated, in accordance with an embodiment of the invention. Standing wave thermoacoustic piezoelectric apparatus 100 generates electrical energy from heat energy. Standing wave thermoacoustic piezoelectric apparatus 100 includes a housing 102. Housing 102 includes a compressible fluid 104. Compressible fluid 104 is one of air and a helium gas. It may be apparent to a person skilled in the art that any other gases may be used as a compressible fluid in housing 102. Further, housing 102 includes a first portion 106 and a second portion 108. A configuration of first portion 106 may be one of a straight configuration and an optimally shaped configuration. In an embodiment, first portion 106 may be optimally shaped to have a tapered configuration. Similarly, a configuration of second portion 108 may be one of a straight configuration and an optimally shaped configuration. In an embodiment, second portion 108 may be optimally shaped to have a tapered configuration.

Additionally, a cross-sectional shape associated with one or more of first portion 106 and second portion 108 may be one of a circle, a square, a rectangle, and a polygon. For example in a scenario, first portion 106 may have a tapered configuration with a circular cross section and second portion 108 may have a tapered configuration with a circular cross section. Alternatively, first portion 106 and second portion 108 may have different configuration and cross-sectional shape. For example, first portion 106 may have a straight configuration and a rectangular cross-sectional shape, and second portion 108 may have a tapered configuration and a circular cross-sectional shape.

Second portion 108 receives the heat energy from a heat source. The heat source may include solar energy or any other sources of heat energy. The heat energy received by second portion 108 creates a temperature gradient between first portion 106 and second portion 108. Additionally, first portion 106 includes a cold heat exchanger 110 at one end of first portion 106. Cold heat exchanger 110 facilitates in maintaining the temperature gradient between first portion 106 and second portion 108. For example, cold heat exchanger 110 present in first portion 106 of housing 102 maintains a temperature level of first portion 106 below a temperature level of second portion 108 of housing 102 that is exposed to the heat source. As a result, the temperature gradient is maintained between first portion 106 and second portion 108.

Standing wave thermoacoustic piezoelectric apparatus 100 may further include a porous stack 112. Porous stack 112 may include, but are not limited to, one or more of metal foils, a metal mesh, a sheet of a foamed metal, and a sheet of filter paper. Porous stack 112 has cold heat exchanger 110 positioned at one end within housing 102. For example, porous stack 112 is configured such that cold heat exchanger 110 is positioned at one end of porous stack 112.

During operation of standing wave thermoacoustic piezoelectric apparatus 100, compressible fluid 104 within housing 102 traverses between first portion 106 and second portion 108 through porous stack 112 in response to the temperature gradient created between first portion 106 and second portion 108. Thereafter, a cyclic transformation takes place inside compressible fluid 104. The cyclic transformation includes compression, heating, expansion, and cooling of one or more fluid parcels of compressible fluid 104 within housing 102. A cyclic transformation of one or more fluid parcels in a standing wave thermoacoustic piezoelectric apparatus is explained in detail in conjunction with FIG. 3A and FIG. 3B. This cyclic transformation of compressible fluid 104 results in the generation of two acoustic waves. These two acoustic waves travel in opposite directions within first portion 106. The two acoustic waves may have different frequencies. When the frequencies of the two acoustic waves match, standing acoustic waves are generated within first portion 106 of housing 102.

In an exemplary embodiment, two acoustic waves may be generated inside a first portion of a housing of a standing wave thermoacoustic piezoelectric apparatus. One of the two acoustic waves having frequency 15 Hz may travel towards a cold heat exchanger and another acoustic wave of the two acoustic waves having frequency of 20 Hz may travel away from the cold heat exchanger. A standing acoustic wave is usually generated when two opposite acoustic waves have same frequencies. In this case, a standing acoustic wave may be generated when frequency of one acoustic wave matches the frequency of another acoustic wave. An instance of the standing acoustic waves within first portion 106 is explained in conjunction with FIG. 2. These standing acoustic waves generate acoustic energy within first portion 106.

In an embodiment, frequency associated with the standing acoustic waves may be changed based on dimension of one or more of first portion 106 and second portion 108. The dimension of first portion 106 includes one or more of, but not limited to, configuration of first portion 106, cross-sectional shape of first portion 106, and length of first portion 106. Similarly, the dimension of second portion 108 includes one or more of, but not limited to, configuration of second portion 108, cross-sectional shape of second portion 108, and length of second portion 108. For example, frequency of standing acoustic waves in a standing wave thermoacoustic piezoelectric apparatus having a long first portion may be less as compared to frequency of standing acoustic waves in a standing wave thermoacoustic piezoelectric apparatus having a short first portion.

In an embodiment, the standing acoustic waves generated within first portion 106 of housing 102 may be varied by varying the heat energy supplied by the heat source to second portion 108. For example, in an instance, the temperature level of first portion 106 of housing 102 and the temperature level of second portion 108 of housing 102 may become equal, thereby resulting in loss of temperature gradient within housing 102. To develop the temperature gradient, an amount of heat energy supplied to second portion 108 of the housing may be increased.

In another instance, the temperature level of second portion 108 of the housing may decrease, thereby resulting in decrease in the temperature gradient between first portion 106 and second portion 108 of housing 102. This decrease in temperature gradient results in generation of low frequency standing acoustic waves. In order to develop standing acoustic waves of higher frequency, amount of heat energy supplied to second portion 108 may be increased to increase the temperature level of second portion 108. This increase in temperature level of second portion 108 results in increase of the temperature gradient within housing 102. Such an increase in temperature gradient facilitates in the creation of standing acoustic waves of higher frequency.

In an embodiment, the heat energy supplied to second portion 108 may be varied by changing area of second portion 108 exposed to the heat source. For example, heat energy supplied may be varied by exposing a larger area of second portion 108 of housing 102 to the heat source. In another embodiment, the heat energy is varied based on a heat threshold. The heat threshold is associated with an amount of heat energy required for generating the standing acoustic waves. For example, the heat threshold is the amount of heat energy required for generating a quarter cycle of the standing acoustic waves. However, it will be apparent to the person skilled in the art that the heat threshold may be the amount of heat energy for generating any number of cycles of the standing acoustic waves.

In still another embodiment, temperature associated with cold heat exchanger 110 is varied to generate the standing acoustic waves within first portion 106. For example, temperature associated with cold heat exchanger 110 is decreased such that the frequencies of the two acoustic waves travelling within the housing in opposite direction matches to generate the standing acoustic waves within first portion 106 of housing 102.

In another embodiment, temperature of compressible fluid 104 may be varied to generate the standing acoustic waves within first portion 106 of housing 102. The temperature of compressible fluid 104 may be varied by varying the temperature of surrounding of standing wave thermoacoustic piezoelectric apparatus 100. For example, in order to match the frequencies of the two acoustic waves travelling in opposite direction, the temperature of surrounding is increased. This increase in temperature of the surrounding heats housing 102 thereby heating compressible fluid 104 for generating the standing acoustic waves within first portion 106.

Standing wave thermoacoustic piezoelectric apparatus 100 uses the standing acoustic waves to generate the electrical energy. Standing wave thermoacoustic piezoelectric apparatus 100 includes a piezoelectric bimorph 114 at an end of first portion 106. Piezoelectric bimorph 114 is configured at an end of first portion 106 opposite to an end of first portion 106 where cold heat exchanger 110 is configured. Piezoelectric bimorph 114 oscillates based on the acoustic energy generated by the standing acoustic waves within first portion 106 of housing 102. The oscillation of piezoelectric bimorph 114 is utilized for generating the electrical energy. The electrical energy is generated using any existing system known in the art. The existing system utilizes the oscillation of the piezoelectric bimorph to generate the electrical energy. Thus, the amount of the electrical energy generated may be based on a frequency of oscillation of the piezoelectric bimorph. For example, a frequency of oscillations of the piezoelectric bimorph may be increased to increase the amount of electrical energy generated.

Standing wave thermoacoustic piezoelectric apparatus 100 uses piezoelectric bimorph 114 and includes fixed parts to generate electrical energy from heat energy. The use of such fixed parts eliminates the need of sliding seal mechanisms. Further, referring back to optimally shaped configuration of one or more of first portion 106 and second portion 108 of standing wave thermoacoustic piezoelectric apparatus 100, a tapered configuration of one or more of first portion 106 and second portion 108 increases the intensity of the standing acoustic waves generated in first portion 106 and second portion 108. Moreover, this also reduces the need of high temperature gradient between first portion 106 and second portion 108 for creating high intensity standing acoustic waves.

Figure 2:
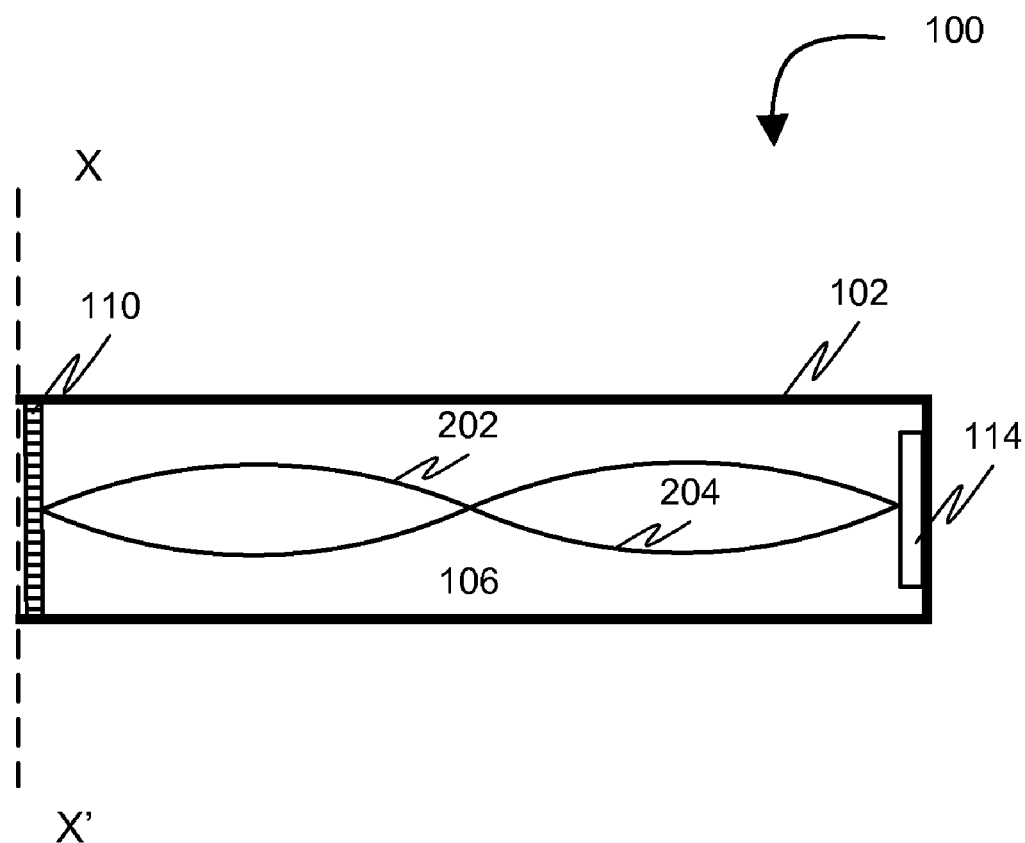
FIG. 2 illustrates a standing acoustic wave generated within a standing wave thermoacoustic piezoelectric apparatus in accordance with an embodiment of the invention.

Referring now to FIG. 2, first portion 106 of standing wave thermoacoustic piezoelectric apparatus 100 having a standing acoustic wave generated within standing wave thermoacoustic piezoelectric apparatus 100 is shown in accordance with an embodiment of the invention. As shown in FIG. 2 an axis X-X' cuts along standing wave thermoacoustic piezoelectric engine 100 to show first portion 106 of standing wave thermoacoustic piezoelectric apparatus 100. The standing acoustic wave is generated from two acoustic waves, such as, an acoustic wave 202 and an acoustic wave 204, traveling in opposite directions within standing wave thermoacoustic piezoelectric apparatus 100. When two acoustic waves 202 and 204 have same frequencies the standing acoustic wave are generated. The generation of the standing acoustic wave is explained in detail in conjunction with FIG. 1. The standing acoustic wave as shown here may have one cycle. It will be apparent to a person skilled in the art that the standing acoustic wave may have any number of cycles within standing wave thermoacoustic piezoelectric apparatus 100. These standing acoustic waves generated within first portion 106 may have a phase difference of 90° between velocity of the one or more fluid parcels of compressible fluid 104 and pressure of the one or more fluid parcels of compressible fluid 104. In other words, the one or more fluid parcels of compressible fluid 104 may have a negligible velocity when the pressure at the one or more fluid parcels is at a maximum level or a minimum level.

Figure 3:
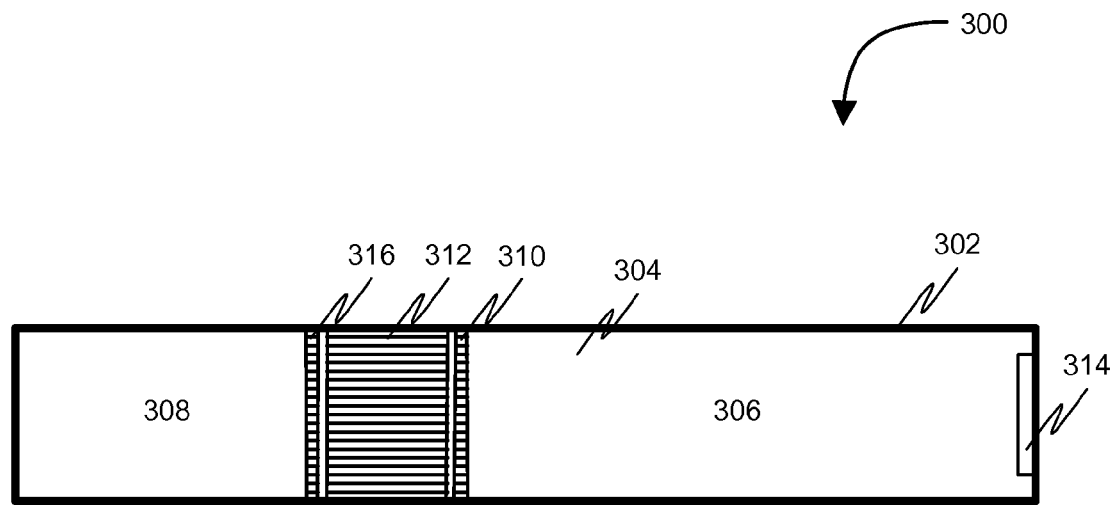
FIG. 3 illustrates a standing wave thermoacoustic piezoelectric apparatus in accordance with another embodiment of the invention.

Turning now to FIG. 3, a standing wave thermoacoustic piezoelectric apparatus 300 in accordance with another embodiment of the invention is shown. Standing wave thermoacoustic piezoelectric apparatus 300 includes a housing 302. Housing 302 includes a compressible fluid 304. Further, housing 302 has a first portion 306 and a second portion 308. First portion 306 includes a cold heat exchanger 310. This is explained in detail in conjunction with FIG. 1.

Further, standing wave thermoacoustic piezoelectric apparatus 300 includes a porous stack 312 and a piezoelectric bimorph 314. Porous stack 212, piezoelectric bimorph 314, and cold heat exchanger 310 are structurally similar to porous stack 112, piezoelectric bimorph 114, and cold heat exchanger 110 of standing wave thermoacoustic piezoelectric apparatus 100. Additionally, porous stack 312, piezoelectric bimorph 314, and cold heat exchanger 310 also function in a similar fashion as porous stack 112, piezoelectric bimorph 114, and cold heat exchanger 110 of standing wave thermoacoustic piezoelectric apparatus 100. The function of porous stack 112, piezoelectric bimorph 114, and cold heat exchanger 110 are explained in detail in conjunction with FIG. 1.

Standing wave thermoacoustic piezoelectric apparatus 300 further includes a hot heat exchanger 316 within housing 302.

Hot heat exchanger 316 is positioned at an end of porous stack 312 opposite to an end of porous stack 312 where cold heat exchanger 310 is configured. In this case, porous stack 312 may be positioned between hot heat exchanger 316 and cold heat exchanger 310 as shown in FIG. 3. Hot heat exchanger 316 receives the heat energy from a heat source. The heat energy received by hot heat exchanger 316 creates a temperature gradient between first portion 306 and second portion 308 of housing 302. For example, a temperature gradient between first portion 306 and second portion 308 is created as second portion 308 of housing 302 is at higher temperature and first portion 306 of housing 302 is at lower temperature. Hot heat exchanger 316 heats second portion 308 to maintain second portion 308 at a higher temperature. Similarly, cold heat exchanger 310 cools first portion 306 of housing 302 to keep first portion 306 at a lower temperature.

In response to creating the temperature gradient, compressible fluid 304 within housing 302 traverses between first portion 306 and second portion 308 through porous stack 312. Due to the temperature gradient, a cyclic transformation takes place inside compressible fluid 304. The cyclic transformation includes compression, heating, expansion, and cooling of one or more fluid parcels of compressible fluid 304 within housing 302. A cyclic transformation of one or more fluid parcels in a standing wave thermoacoustic piezoelectric apparatus is explained in detail in conjunction with FIG. 4A and FIG. 4B. The cyclic transformation of compressible fluid 304 generates standing acoustic waves within first portion 306 of housing 302. The generation of standing acoustic waves is explained in detail in conjunction with FIG. 1 and FIG. 2.

In an embodiment, the heat energy supplied by the heat source to second portion 308 may be varied to generate the standing acoustic waves within first portion 306 of housing 302. The heat energy supplied to second portion 308 may be varied by changing area of hot heat exchanger 316 exposed to the heat source. For example, heat energy supplied may be varied by exposing a larger area of hot heat exchanger 316 to the heat source. In another embodiment, temperature associated with hot heat exchanger 316 is varied to generate the standing acoustic waves within first portion 306. The standing acoustic waves are used to generate acoustic energy in first portion 306. Thereafter, piezoelectric bimorph 314 oscillates based on the acoustic energy generated by the standing acoustic waves. The oscillation of piezoelectric bimorph 314 is utilized for generating the electrical energy. This is explained in detail in conjunction with FIG. 1.

Figure 4A:
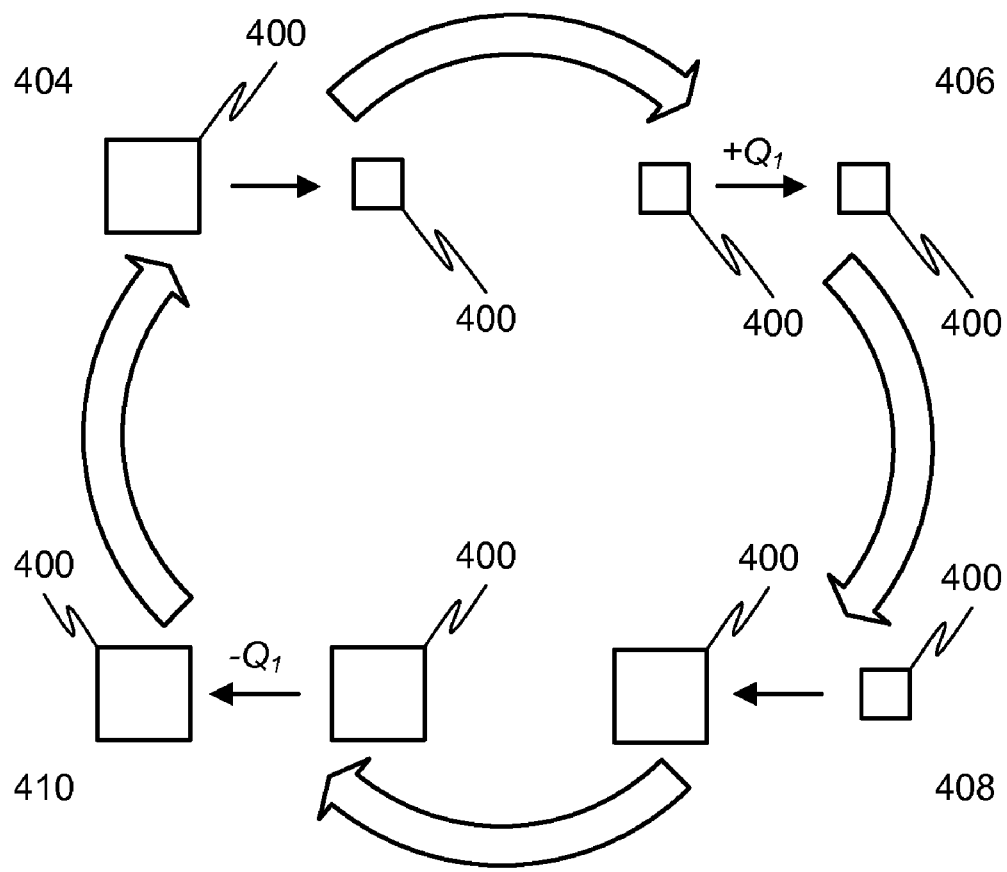
FIG. 4A illustrates a thermodynamic cycle of a fluid parcel of a compressible fluid within a standing wave thermoacoustic piezoelectric apparatus for generating standing acoustic waves in accordance with an embodiment of the invention.
Figure 4B:
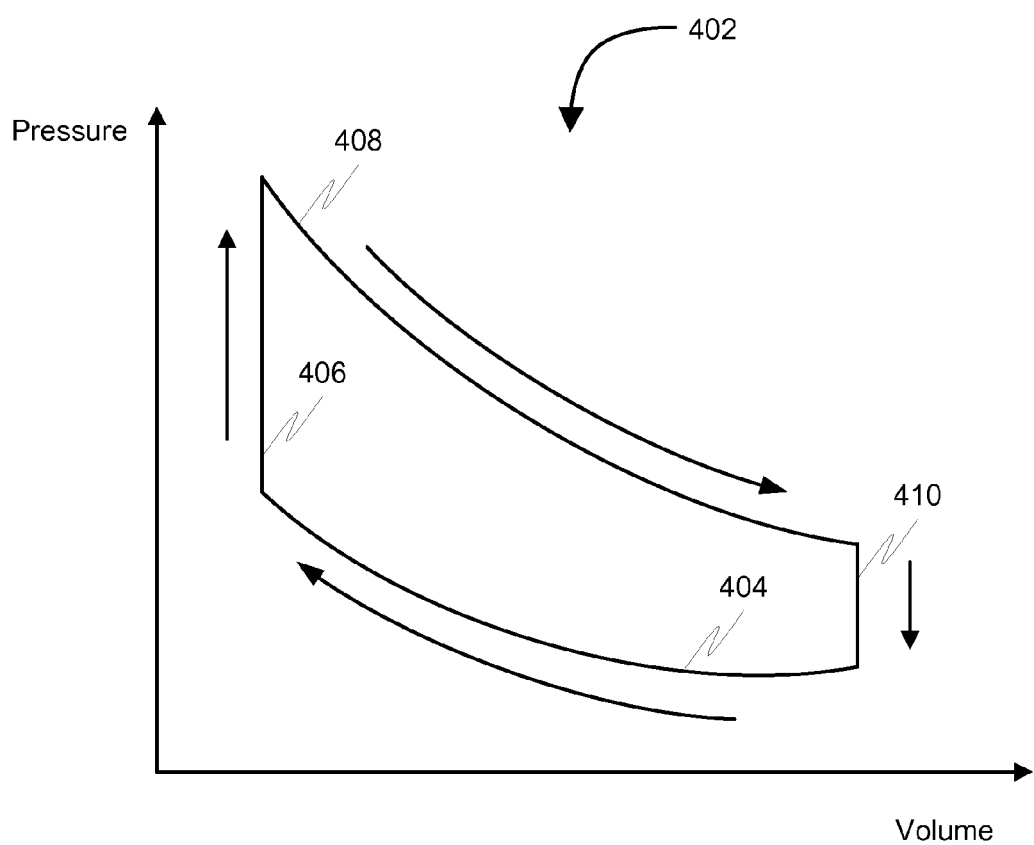
FIG. 4B illustrates a Pressure-Volume (PV) diagram associated with the thermodynamic cycle of the fluid parcel for generating standing acoustic waves.

Turning now to FIG. 4A that illustrates a thermodynamic cycle of a fluid parcel 400 of a compressible fluid inside a standing wave thermoacoustic piezoelectric apparatus for generating standing acoustic waves and FIG. 4B that illustrates a Pressure-Volume (P-V) diagram 402 associated with the thermodynamic cycle of fluid parcel 400 in accordance with an embodiment of the invention. The thermodynamic cycle indicates a cyclic transformation undergone by fluid parcel 400 of the compressible fluid such as, compressible fluid 104 and compressible fluid 304 within a standing wave thermoacoustic piezoelectric apparatus such as, standing wave thermoacoustic piezoelectric apparatus 100 and standing wave thermoacoustic piezoelectric apparatus 300. The cyclic transformation includes compression of fluid parcel 400, heating of fluid parcel 400, expansion of fluid parcel 400, and cooling of fluid parcel 400. Further, during the cyclic transformation of fluid parcel 400, a pressure and a volume associated with fluid parcel 400 changes and such a change in the pressure and the volume is indicated in P-V diagram 402 as shown in FIG. 4B.

The cyclic transformation of fluid parcel 400 takes place upon creation of a temperature gradient between a first portion such as, first portion 106 and first portion 306, and a second portion, such as second portion 108 and second portion 308. The temperature gradient is created as the second portion has a higher temperature as compared to the first portion. This is explained in detail in conjunction with FIG. 1.

Due to this temperature gradient, the cyclic transformation of the compressible fluid takes place. During the cyclic transformation, the compressible fluid traverses between the first portion and the second portion of a housing such as, housing 102 and housing 302 of standing wave thermoacoustic piezoelectric apparatus 100. As the second portion is at a higher temperature based on the temperature gradient, the compressible fluid traverses from the second portion to the first portion. This traversal of the compressible fluid from the second portion to the first portion causes compression of fluid parcel 400 in the first portion as well as traversal of fluid parcel 400 away from the second portion at stage 404. The compression of fluid parcel 400 decreases the volume of fluid parcel 400 and increases the pressure of fluid parcel 400. This reduction in the volume and increase in the pressure is indicated by stage 404 as shown in P-V diagram 402. At stage 406, heating of fluid parcel 400 collects heat in response to the compression of fluid parcel 400. For example, fluid parcel 400 collects $Q_1$ heat at constant volume. The heating of fluid parcel 400 at constant volume is indicated by stage 406 as shown in P-V diagram 402. At this stage, the pressure of fluid parcel 400 is maximum and the velocity of fluid parcel 400 is negligible.

In response to the heating, fluid parcel 400 expands at stage 408 within the first portion. The expansion of fluid parcel 400 increases the volume of fluid parcel 400 and decreases the pressure of fluid parcel 400 inside the first portion. This change in the pressure and the volume of fluid parcel 400 is indicated by stage 408 as shown in P-V diagram 402. Due to the expansion of fluid parcel 400 within the first portion, the compressible fluid traverses from the first portion to the second portion. This traversal of the compressible fluid from the first portion to the second portion causes expansion of fluid parcel 400 in the first portion as well as traversal of fluid parcel 400 towards the second portion at stage 408. Thereafter at stage 410, fluid parcel 400 dissipates heat in response to the expansion of fluid parcel 400. For example, fluid parcel 400 dissipates $Q_2$ heat at constant volume. The cooling of fluid parcel 400 at constant volume is indicated by stage 410 as shown in P-V diagram 402. At this stage, the pressure of fluid parcel 400 is minimum and the velocity of fluid parcel 400 is negligible. The cooling of fluid parcel 400 further results in traversal of the compressible fluid from the second portion to the first portion resulting in compression of fluid parcel 400 in the first portion similar to stage 404. Thus, resulting in the cyclic transformation of fluid parcel 400 inside the standing wave thermoacoustic piezoelectric apparatus.

During the cyclic transformation inside the compressible fluid, the compression and expansion of the one or more fluid parcels of the compressible fluid results in back and forth movement of the one or more fluid parcels along the standing wave thermoacoustic piezoelectric apparatus. The back and forth movement of the one or more fluid parcels generate two acoustic waves within the first portion of the housing. The two acoustic waves travel in opposite directions as one acoustic wave of the two acoustic waves is a reflection of another acoustic wave of the two acoustic waves. When the frequencies of the two acoustic waves match, standing acoustic waves are created within the first portion of the housing. This is explained in detail in conjunction with FIG. 1 and FIG. 2. The standing acoustic waves thus generated enables a piezoelectric bimorph such as piezoelectric bimorph 114 and piezoelectric bimorph 314 to oscillate.

Figure 5A:
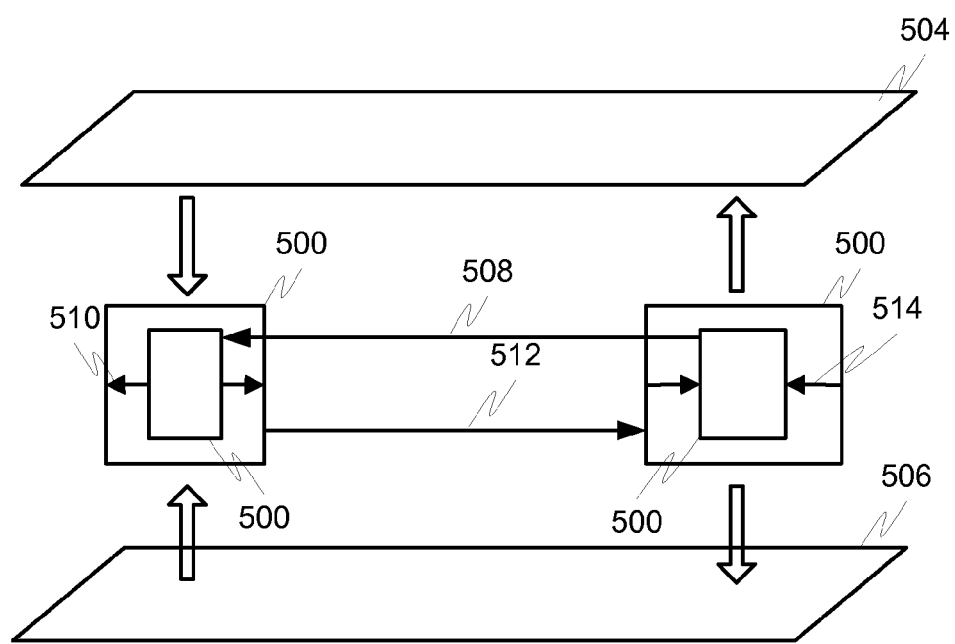
FIG. 5A illustrates a thermodynamics cycle of a fluid parcel of a compressible fluid inside a porous stack within a standing wave thermoacoustic piezoelectric apparatus in accordance with an embodiment of the invention.
Figure 5B:
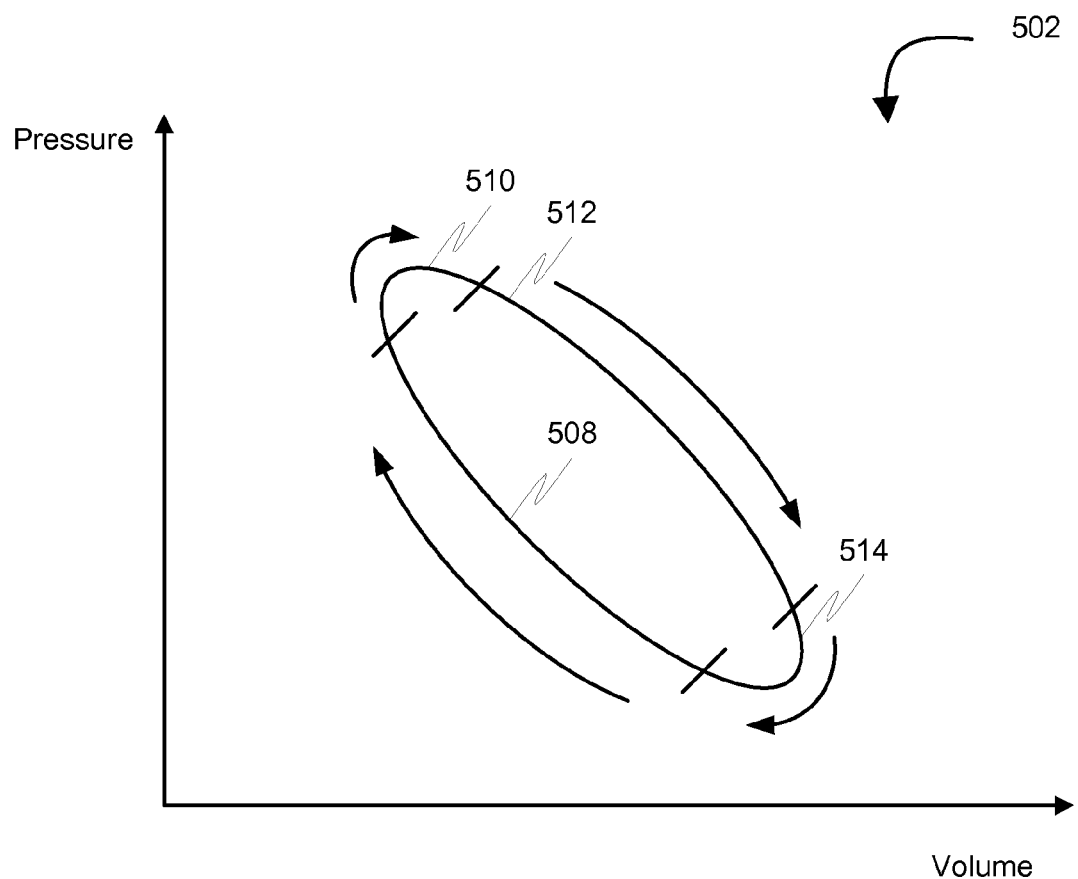
FIG. 5B illustrates a Pressure-Volume (P-V) diagram associated with the thermodynamic cycle of the fluid parcel inside the porous stack.

Referring now to FIG. 5A that illustrates a thermodynamics cycle of a fluid parcel 500 of a compressible fluid inside a porous stack within a standing wave thermoacoustic piezoelectric apparatus and FIG. 5B that illustrates a Pressure-Volume (P-V) diagram 502 for the thermodynamic cycle of fluid parcel 500 inside the porous stack within the standing wave thermoacoustic piezoelectric apparatus in accordance with an embodiment of the invention. The thermodynamic cycle indicates a cyclic transformation undergone by fluid parcel 500 of the compressible fluid such as, compressible fluid 104 and compressible fluid 304 inside the porous stack such as, porous stack 112 and porous stack 312 within the standing wave thermoacoustic piezoelectric apparatus such as, standing wave thermoacoustic piezoelectric apparatus 100 and standing wave thermoacoustic piezoelectric apparatus 300. The cyclic transformation of fluid parcel 500 is due to the generation of standing acoustic waves within a first portion such as, first portion 106 and first portion 306. The standing acoustic waves are created due to a temperature gradient between the first portion and the second portion. Further, during the cyclic transformation of fluid parcel 500, a pressure and volume associated with fluid parcel 500 changes and such a change in the pressure and the volume is illustrated in P-V diagram 502 as shown in FIG. 5B.

Due to the standing acoustic waves, fluid parcel 500 traverses between the cold heat exchanger and the hot heat exchanger through the porous stack of the standing wave thermoacoustic piezoelectric apparatus. The standing acoustic waves enables one or more fluid parcels of the compressible fluid present near the cold heat exchanger pushes fluid parcel 500 thereby decreasing the volume of fluid parcel 500. The one or more fluid parcels may have maximum velocity when they are travelling away from the cold heat exchanger. Thereafter, fluid parcel 500 starts traveling towards the hot heat exchanger from the cold heat exchanger. This results in compression of fluid parcel 500 at stage 508. The compression of fluid parcel 500 decreases the volume of fluid parcel 500 and increases the pressure of fluid parcel 500. This reduction in the volume and increase in the pressure is indicated by stage 508 as shown in P-V diagram 502. Towards the end of stage 508 temperature of fluid parcel 500 is lower as compared to temperature of walls of the porous stack near fluid parcel 500. At stage 510, fluid parcel 500 receives heat from one or more of the hot heat exchanger and the walls of the porous stack. This results in heating of fluid parcel 500 and cooling of the hot heat exchanger. The heating of fluid parcel 500 is indicated by stage 510 as shown in P-V diagram 502.

Further, when the standing acoustic waves pulls one or more fluid parcels of the compressible fluid near the cold heat exchanger, volume of fluid parcel 500 starts increasing. In this case, the one or more fluid parcels of the compressible fluid may have maximum velocity towards the cold heat exchanger. Thereafter, fluid parcel 500 starts traveling towards the cold heat exchanger. This results in expansion of fluid parcel 500 at stage 512. The expansion of fluid parcel 500 increases the volume of fluid parcel 500 and decreases the pressure of fluid parcel 500. This increase in the volume and reduction in the pressure is indicated by stage 512 as shown in P-V diagram 502. Towards the end of stage 512 temperature of fluid parcel 500 is higher as compare to walls of the porous stack near fluid parcel 500. At stage 514, fluid parcel dissipates heat to one or more of the cold heat exchanger and the walls of the porous stack. This results in cooling of fluid parcel 500 and heating of the cold heat exchanger. The cooling of fluid parcel 500 is indicated by stage 514 as shown in P-V diagram 502. In the meanwhile, the standing acoustic waves again push fluid parcel 500 towards the hot heat exchanger from the cold heat exchanger similar to stage 508. Thus, resulting in the cyclic transformation of fluid parcel 500 inside the porous stack within the standing wave thermoacoustic piezoelectric apparatus.

Figure 6:
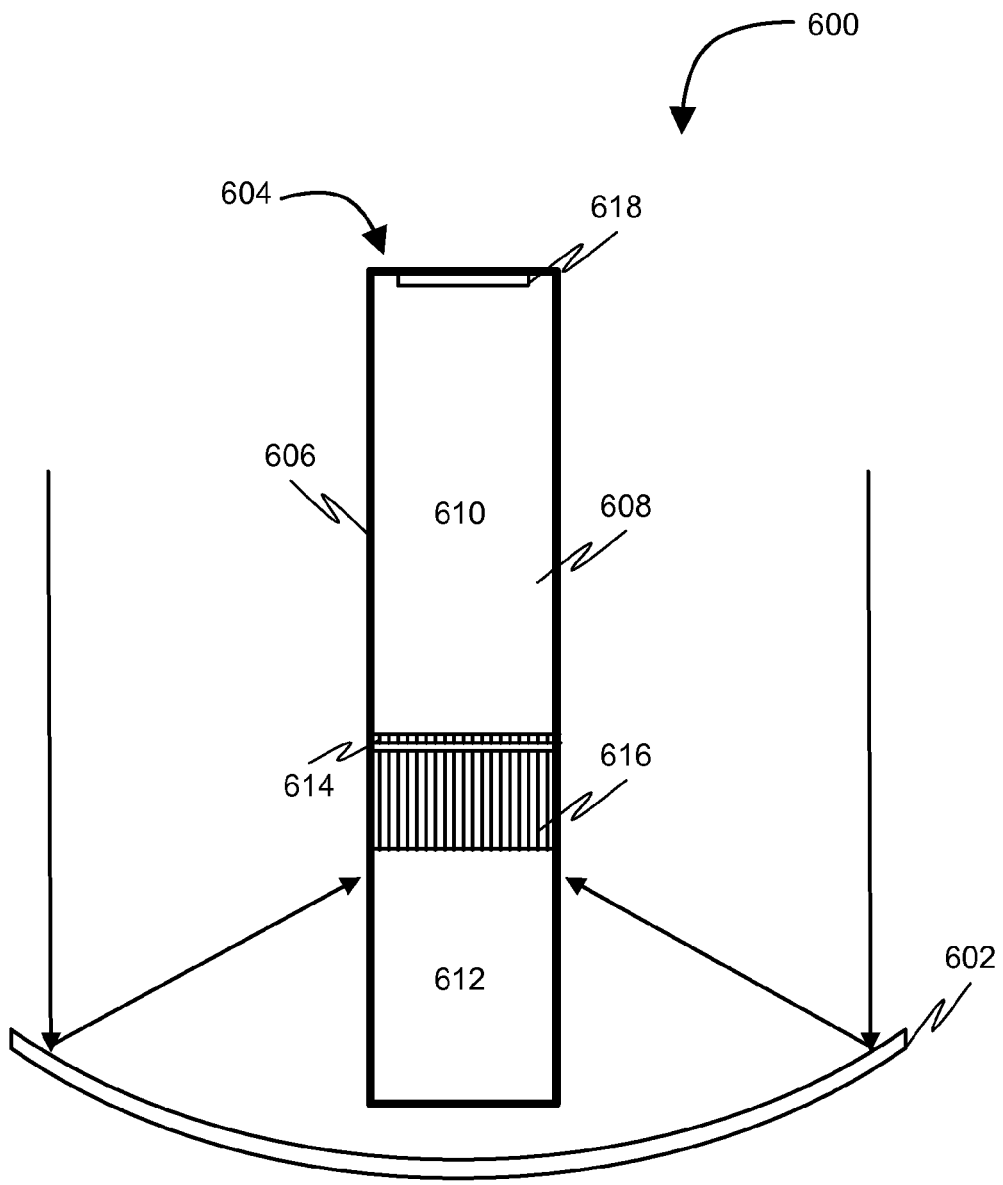
FIG. 6 illustrates a standing wave thermoacoustic piezoelectric system in accordance with an embodiment of the invention.

Referring now to FIG. 6, a standing wave thermoacoustic piezoelectric system 600 is illustrated, in accordance with an embodiment of the invention. Standing wave thermoacoustic piezoelectric system 600 generates electrical energy from heat energy. Standing wave thermoacoustic piezoelectric system 600 includes a solar concentrator 602 and a standing wave thermoacoustic piezoelectric apparatus 604. Solar concentrator 602 supplies the heat energy for generating the electrical energy. The heat energy supplied by solar concentrator 602 may in the form of solar energy. Solar concentrator 602 is optimally shaped to efficiently provide the heat energy to standing wave thermoacoustic piezoelectric apparatus 604 for generating standing acoustic waves. Standing wave thermoacoustic piezoelectric apparatus 604 includes a housing 606. Housing 606 includes a compressible fluid 608. Further, housing 606 has a first portion 610 and a second portion 612. This is explained in detail in conjunction with FIG. 1.

Second portion 612 of housing 606 receives the heat energy from solar concentrator 602. Solar concentrator 602 is arranged within standing wave thermoacoustic piezoelectric system 600 in a manner for efficiently directing heat energy at second portion 612. The heat energy received by second portion 612 creates a temperature gradient between first portion 610 and second portion 612 of housing 606. The temperature associated with second portion 612 may be changed by varying an amount of heat energy supplied to second portion 612. The heat energy supplied to second portion 612 may be varied by adjusting an orientation of solar concentrator 602. Additionally, first portion 610 includes a cold heat exchanger 614 at one end of first portion 610. Cold heat exchanger 614 facilitates in maintaining the temperature gradient between first portion 610 and second portion 612. Further, standing wave thermoacoustic piezoelectric apparatus 604 may include a porous stack 616. Porous stack 616 may include, but are not limited to, one or more of metal foils, a metal mesh, a sheet of a foamed metal, and a sheet of filter paper. Porous stack 616 has cold heat exchanger 614 positioned at one end of porous stack 616 within housing 606.

In an embodiment, standing wave thermoacoustic piezoelectric apparatus 604 may include a hot heat exchanger (not shown in FIG. 6) within housing 606. The hot heat exchanger is positioned at an end of porous stack 616 opposite to an end of porous stack 616 where cold heat exchanger 614 is positioned. The hot heat exchanger receives the heat energy from solar concentrator 602. The heat energy received by the hot heat exchanger creates the temperature gradient between first portion 610 and second portion 612 of housing 606. This is explained in detail in conjunction with FIG. 3.

Compressible fluid 608 within housing 606 traverses between first portion 610 and second portion 612 through porous stack 616 in response to the temperature gradient created between first portion 610 and second portion 612. Due to the temperature gradient, a cyclic transformation takes place inside compressible fluid 608. The cyclic transformation includes compression, heating, expansion, and cooling of one or more of fluid parcels of compressible fluid 608 within housing 606. A cyclic transformation of one or more fluid parcels in a standing wave thermoacoustic piezoelectric apparatus is explained in detail in conjunction with FIG. 4A and FIG. 4B. The cyclic transformation of compressible fluid 608 results in the generation of standing acoustic waves for generating acoustic energy within first portion 610.

Further, standing wave thermoacoustic piezoelectric apparatus 604 includes a piezoelectric bimorph 618 at an end of first portion 610. Piezoelectric bimorph 604 is configured at an end of first portion 610 opposite to an end of first portion 610 where cold heat exchanger 614 is configured. Piezoelectric bimorph 618 oscillates based on the acoustic energy generated by the standing acoustic waves within housing 606. The oscillation of piezoelectric bimorph 618 is utilized for generating the electrical energy.

Various embodiments of the present invention provide a standing wave thermoacoustic piezoelectric apparatus for generating electrical energy from heat energy. The standing wave thermoacoustic piezoelectric apparatus generates electrical energy using a piezoelectric bimorph. As a result, the electrical energy is generated efficiently without using complex mechanisms for the generation of the electrical energy. Further, the standing wave thermoacoustic piezoelectric apparatus uses piezoelectric bimorph along with fixed parts thereby eliminating the need of sliding seal mechanisms. Moreover, one or more of a first portion and a second portion of the standing wave thermoacoustic piezoelectric apparatus may have tapered configuration. The tapered configuration increases the intensity of the standing acoustic waves generated in the first portion thereby reducing the need of high temperature gradient between the first portion and the second portion to create high intensity standing acoustic waves. Moreover, the standing wave thermoacoustic piezoelectric apparatus may use solar energy directly to generate the electrical energy from the solar energy. This enables the standing wave thermoacoustic piezoelectric apparatus to generate the electrical energy in an environment friendly manner.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A standing wave thermoacoustic piezoelectric apparatus for generating electrical energy from heat energy, the standing wave thermoacoustic piezoelectric apparatus comprising:
    a housing comprising a compressible fluid, the housing having a first portion and a second portion, wherein the second portion receives the heat energy from a heat source for creating a temperature gradient between the second portion and the first portion of the housing, the first portion comprising a cold heat exchanger;
    a porous stack configured within the housing, the porous stack having the cold heat exchanger positioned at one end, whereby the compressible fluid traverses between the first portion and the second portion through the porous stack to generate standing acoustic waves for generating acoustic energy in the first portion; and
    a piezoelectric bimorph configured at an end of the first portion opposite to an end of the first portion having the cold heat exchanger, wherein the piezoelectric bimorph is capable of oscillating based on the acoustic energy, the oscillation of the piezoelectric bimorph is utilized for generating the electrical energy.

2. The standing wave thermoacoustic piezoelectric apparatus of claim 1, wherein the heat energy supplied by the heat source to the second portion is varied based on a heat threshold to generate the standing acoustic waves in the first portion of the housing, the heat threshold is associated with an amount of heat required for generating the standing acoustic waves.

3. The standing wave thermoacoustic piezoelectric apparatus of claim 2, wherein temperature of the second portion is varied by changing the area of the second portion exposed to the heat source.

4. The standing wave thermoacoustic piezoelectric apparatus of claim 1 further comprising:
    a hot heat exchanger configured within the housing, the hot heat exchanger positioned at an end of the porous stack opposite to an end of the porous stack having the cold heat exchanger, wherein the hot heat exchanger receives the heat energy from the heat source for creating the temperature gradient.

5. The standing wave thermoacoustic piezoelectric apparatus of claim 4, wherein temperature of the second portion is varied by changing the area of the hot heat exchanger exposed to the heat source.

6. The standing wave thermoacoustic piezoelectric apparatus of claim 4, wherein temperature associated with the hot heat exchanger is varied to generate the standing acoustic waves in the first portion of the housing.

7. The standing wave thermoacoustic piezoelectric apparatus of claim 1, wherein temperature associated with the cold heat exchanger is varied to generate the standing acoustic waves in the first portion of the housing.

8. The standing wave thermoacoustic piezoelectric apparatus of claim 1, wherein temperature of the compressible fluid is varied to generate the standing acoustic waves in the first portion of the housing.

9. The standing wave thermoacoustic piezoelectric apparatus of claim 1, wherein the porous stack comprises at least one of metal foils, a metal mesh, a sheet of a foamed metal, and sheets of filter paper.

10. The standing wave thermoacoustic piezoelectric apparatus of claim 1, wherein the compressible fluid is one of air and helium.

11. The standing wave thermoacoustic piezoelectric apparatus of claim 1, wherein a configuration of the first portion of the housing is one of a straight configuration and an optimally shaped configuration.

12. The standing wave thermoacoustic piezoelectric apparatus of claim 1, wherein a configuration of the second portion of the housing is one of a straight configuration and an optimally shaped configuration.

13. A standing wave thermoacoustic piezoelectric system for generating electrical energy from heat energy, wherein the standing wave thermoacoustic piezoelectric system comprises:
    a solar concentrator configured to supply the heat energy for generating the electrical energy; and
    a standing wave thermoacoustic piezoelectric apparatus comprising, a housing having a first portion and a second portion, wherein the housing comprises a compressible fluid, wherein the second portion receives the heat energy from the solar concentrator for creating a temperature gradient between the second portion and the first portion of the housing, the first portion comprising a cold heat exchanger;

a porous stack configured within the housing, the porous stack having the cold heat exchanger positioned at one end, whereby the compressible fluid traverses between the first portion and the second portion through the porous stack to generate standing acoustic waves for generating acoustic energy in the first portion, and a piezoelectric bimorph configured at an end of the first portion opposite to an end of the first portion having the cold heat exchanger, wherein the piezoelectric bimorph is capable of oscillating based on the acoustic energy, the oscillation of the piezoelectric bimorph is utilized for generating the electrical energy.

14. The standing wave thermoacoustic piezoelectric system of claim 13, wherein the heat energy supplied by the solar concentrator to the second portion is varied based on a heat threshold to generate the standing acoustic waves in the first portion of the housing, the heat threshold is associated with an amount of heat energy required for generating the standing acoustic waves.

15. The standing wave thermoacoustic piezoelectric system of claim 14, wherein temperature of the second portion is varied by changing the area of the second portion exposed to the solar concentrator.

16. The standing wave thermoacoustic piezoelectric system of claim 13 further comprising:

a hot heat exchanger configured within the housing, the hot heat exchanger positioned at an end of the porous stack opposite to an end of the porous stack having the cold heat exchanger, wherein the hot heat exchanger receives the heat energy from the heat source for creating the temperature gradient.

17. The standing wave thermoacoustic piezoelectric system of claim 16, wherein temperature of the second portion is varied by changing the area of the hot heat exchanger exposed to the heat source.

18. The standing wave thermoacoustic piezoelectric system of claim 16, wherein temperature associated with the hot heat exchanger is varied to generate the standing acoustic waves in the first portion of the housing.

19. The standing wave thermoacoustic piezoelectric system of claim 13, wherein temperature associated with the cold heat exchanger is varied to generate the standing acoustic waves in the first portion of the housing.

20. The standing wave thermoacoustic piezoelectric system of claim 13, wherein temperature of the compressible fluid is varied to generate the standing acoustic waves in the first portion of the housing.

21. The standing wave thermoacoustic piezoelectric system of claim 13, wherein the porous stack comprises at least one of metal foils, a metal mesh, a sheet of a foamed metal, and sheets of filter paper.

22. The standing wave thermoacoustic piezoelectric system of claim 13, wherein the compressible fluid is one of air and helium.

23. The standing wave thermoacoustic piezoelectric system of claim 13, wherein a configuration of the first portion of the housing is one of a straight configuration and an optimally shaped configuration.

24. The standing wave thermoacoustic piezoelectric system of claim 13, wherein a configuration of the second portion of the housing is one of a straight configuration and an optimally shaped configuration.

* * * * *